United States Patent

Buus

[15] 3,679,984

[45] July 25, 1972

[54] PULSED TWO-TONE TEST SIGNAL GENERATOR FOR LINEAR AMPLIFIERS

[72] Inventor: Robert George Buus, Holmdel, N.J.

[73] Assignee: Bell Telephone Laboratories, Incorporated, Murray Hill, Berkeley Heights, N.J.

[22] Filed: Oct. 19, 1970

[21] Appl. No.: 81,755

[52] U.S. Cl. ................................330/2, 330/124 R, 331/74, 330/103

[51] Int. Cl. ........................................................H03f 19/00

[58] Field of Search ........................................330/2; 331/74

[56] References Cited

UNITED STATES PATENTS

| | | | |
|---|---|---|---|
| 2,951,128 | 8/1960 | Kingsbury | 330/2 X |
| 2,808,562 | 10/1957 | French et al. | 331/74 X |
| 2,776,373 | 1/1957 | Mischler | 331/74 X |
| 2,539,826 | 1/1951 | George | 331/74 |

*Primary Examiner*—Nathan Kaufman
*Attorney*—R. J. Guenther and William L. Keefauver

[57] ABSTRACT

The response of a linear amplifier may be evaluated by applying a two-tone test signal, composed of the modulation product of equal amplitude sinusoids at frequencies $f_1$ and $f_2$, to an amplifier and observing the waveform of the output signal on an oscilloscope, or the like. The peak factor of the test signal may be increased by simultaneously pulsing both sinusoidal signals.

According to the invention, a stable envelope pattern with a high peak factor is obtained by developing each of two sinusoidal signals with a pulsed oscillator which employs an operational amplifier in a twin-tee configuration. Feedback in each oscillator is controlled at the threshold between oscillation and high Q bandpass operation. A simple half-wave rectifier arrangement is used to pulse the oscillators.

4 Claims, 6 Drawing Figures

INVENTOR
R.G. BUUS
BY A.E. Hirsch Jr.
ATTORNEY

PULSED TWO-TONE TEST SIGNAL GENERATOR FOR LINEAR AMPLIFIERS

This invention relates to electronic measuring apparatus and more particularly to equipment for testing the performance of linear amplifiers, for example, rf amplifiers employed in single sideband radio transmitters.

BACKGROUND OF THE INVENTION

Modern radio transmitters often use single sideband suppressed carrier modulation produced in the low power stages of the transmitter and amplified before being transmitted. To avoid signal distortion and minimize spurious and undesired radiation, it is necessary that the amplifiers used for such service display a reasonably linear response. Various methods have been used to measure the linearity of these high frequency amplifiers but the simplest (and very popular) method is to modulate the transmitter with two sinusoids of equal amplitude and to observe the resulting rf envelope at the output.

It is well known that an upper sideband suppressed carrier signal modulated by two equal amplitude sinusoids at frequencies $f_1$ and $f_2$ produces an output spectrum consisting of two frequencies, one at $f_c+f_1$ and one at $f_c+f_2$, where $f_c$ is the carrier frequency. The waveform of such an output is shown in FIG. 1. If the difference frequency, $f_d$, is defined by $f_d=|f_1-f_2|$, the time $t_d$ is given by $t_d=2/f_d$. Note that the waveform of FIG. 1 has an envelope which effectively goes through all levels from zero to some peak value. Furthermore, the envelope theoretically should look like the intersection of two sine waves of opposite phase and of frequency $f_d/2$ if there is no distortion. Thus, nonlinear distortion can be observed on such a waveform by noting any deviations from a sine wave. If the peaks are flattened, the gain is decreasing at high levels (usually due to overload). If the sine waves are distorted near their zero crossings, the amplifier is nonlinear at low levels (usually due to improper bias point). A simple linearity test of a single sideband transmitter can therefore be accomplished by applying two equal level audio tones at different frequencies and observing the output envelope.

Two-tone testing as described above, although useful in practice, suffers from the disadvantage that the peak-to-average ratio of the envelope power is not very high; a ratio of about 3 db is typical. On transmitters designed for speech (having a peak-to-average ratio of 12–15 db), high average powers must be maintained during two-tone testing to exercise the transmitter to the same peak values attained when carrying speech. This is often undesirable since many transmitters designed to handle high peaks without distortion, cannot accommodate commensurately large average power. In such transmitters, two-tone testing may not be satisfactory since the transmitter may overheat at much lower power levels than are necessary to find the overload point.

DESCRIPTION OF THE PRIOR ART

One conventional way of increasing the peak factor of the envelope of a two-tone test signal is to pulse the modulating audio signals. The signals are turned on for a fraction of a second, and then turned off for a fraction of a second, and so on. For example, with a 50 percent duty cycle, the peak factor is increased by 3 db and there is half as much average power for the same peak envelope power. Still higher peak factors can be obtained by utilizing shorter duty cycles. However, such pulsing of the audio signals makes viewing of the rf envelope at the output more difficult. The problem is to find a simple way to obtain a readable trace on the oscilloscope.

If, as is usually the case, the oscilloscope sweep is synchronized or triggered at the pulsing frequency, the burst will appear on the same part of the screen, but the envelope of the burst will not generally be viewable because the envelope waveform is not in phase with the starting of the burst. It can be easily shown that the necessary condition to obtain a stable envelope pattern is that the difference frequency, $f_d$, between the audio frequencies, be related to the pulsing frequency, $f_p$, by the relationship $$f_d=nf_p, \quad (1)$$

where $n$ is any integer. Practical circuits to assure this condition are not simple although frequency synthesizing techniques can be used to achieve it. A common procedure is to provide a vernier adjustment of the pulsing frequency, $f_p$, which can be adjusted while viewing the output envelope until the pattern "stands still" on the oscilloscope, at which point the conditions of Equation 1 apply. Although simple, such a method is not very stable and required frequent adjustment.

Another method of obtaining a readable pattern without imposing the conditions of Equation 1 is to synchronize (or trigger) the oscilloscope on a submultiple of the difference frequency, $f_d$. Thus, the envelope will always "stand still" on the oscilloscope while the pulsing itself will "crawl" across the screen at a rate dependent on how close the conditions of Equation 1 are approached. In addition to the objectionable crawl, this method requires obtaining a signal related to the difference frequency of the input signals, not an easy function to implement. In fact, if this difference signal could be easily obtained for synchronizing the oscilloscope, it could also be used to control the pulsing frequency and force the conditions of Equation 1.

SUMMARY OF THE INVENTION

It is, therefore, an object of this invention to simplify the means for generating a two-tone rf envelope signal for use in linear amplifier testing.

It is another object of the invention to develop bursts of sinusoidal waveform energy characterized by reproducible frequency and phase during each burst, thus to constitute an effective pulsed two-tone signal for use in testing linear amplifiers.

It is yet another object of the invention to produce a two-tone test signal characterized by a high peak factor and consistent phase, so that a stable envelope pattern is presented on a viewing oscilloscope, or the like.

In accordance with the present invention, a reproducible pulsed two-tone rf envelope, which exhibits consistent phase during each burst, is developed for testing linear rf amplifiers. I have found that the conditions of Equation 1, based on the assumption that the phase of applied tone signals must be continuous during the "off" portions of the pulsing cycle, are unnecessarily restrictive, and that it is only necessary that the tone signals maintain a *consistent* phase relationship at the beginning of each burst. Thus, phase need not be continuous during the "off" time of the source, and the tones need not have any particular frequency or phase relationship to one another.

In accordance with the invention, a pulsed sinusoidal waveform with consistent phase at the beginning of each pulse interval is obtained through the use of a unique oscillator arrangement that commences oscillation, upon the application of energizing power, consistently at the same point in the cycle. The oscillator is characterized by an operational amplifier in a configuration employing two feedback paths. The so-called twin-tee feedback arrangement is satisfactory. By properly controlling the feedback characteristic of the arrangement, either a narrow band response or oscillation can be obtained when used in the pulsed mode of operation. By adjusting the feedback network to a critical crossover threshold value intermediate the two extremes, a series of bursts of audio waveform, whose frequency is determined by the network, is produced. Each burst is identical and always starts with the same phase provided that the turn-on transient waveform is consistent for each burst. In accordance with the invention, two such networks of different frequency are pulsed simultaneously to produce consistent oscillations. The tone signals so produced are combined and applied to a modulator, for example, a single sideband modulator, to produce a composite signal. The composite signal is then delivered to the input of a linear amplifier whose characteristics are to be observed. The amplifier typically is terminated in a dummy load and the output signal waveform is viewed on a cathode ray oscilloscope. By virtue of the consistent phase configuration of the two-tone signal, the oscilloscope display is stable and requires no auxiliary triggering or synchronization.

In accordance with a feature of the invention, the oscillator networks are powered from half-wave rectified alternating energy of a desired frequency.

The invention will be more fully apprehended from the following detailed description of a preferred illustrative embodiment thereof taken in connection with the appended drawings.

DETAILED DESCRIPTION OF THE INVENTION

Figure 1:
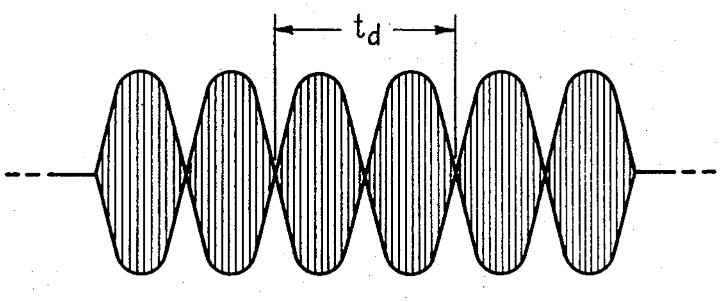
FIG. 1 illustrates the waveform produced by a two-tone test signal as viewed on an oscilloscope.
Figure 2:
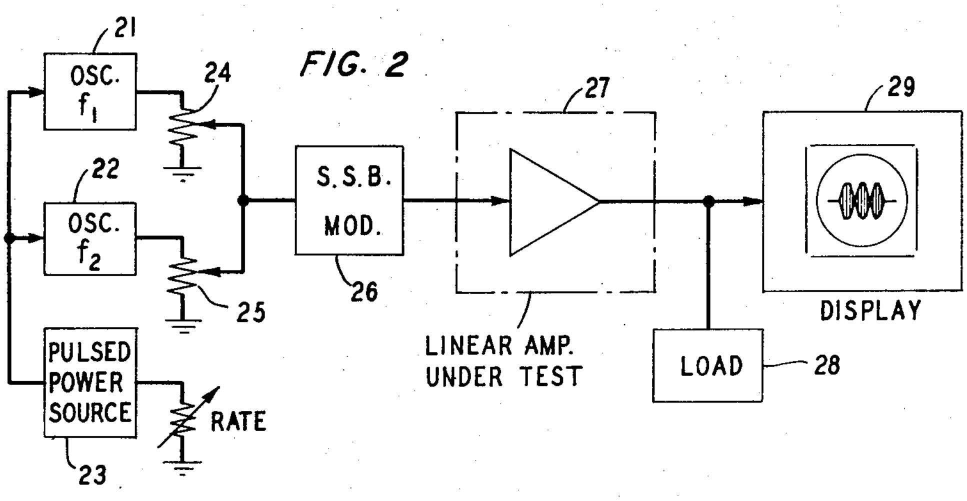
FIG. 2 is a block schematic diagram of a linear amplifier test arrangement which illustrates the principles of the invention.

An arrangement for testing the characteristics of a linear amplifier, for example, the rf amplifiers in a single sideband transmitter, or the like, is illustrated in FIG. 2. Oscillator 21, operating at a frequency $f_1$, and oscillator 22, operating at a frequency $f_2$, are simultaneously energized by pulsed energy from power source 23. Oscillators 21 and 22 are selected to respond to transient power and to break into oscillation always with the same phase. The starting point of the two oscillations need not be the same; it is only necessary that each starts at the same point in its cycle for each power transient. Signals from the two units are adjusted to have equal amplitudes, for example by means of potentiometers 24 and 25 and the composite two-tone signal is supplied to the input of a modulator, for example, single sideband modulator 26, of any desired construction. The modulated composite signal is then supplied to the input of the linear amplifier undergoing tests, e.g., unit 27. Amplifier 27 supplies its output to dummy load 28, and the waveform of the output signal is delivered to display unit 29, for example a cathode ray oscilloscope. Any conventional means for sampling the waveform of the energy delivered from the amplifier to load 28 may be employed. Typically, such units provide the necessary isolation and attenuation to bring the signal within the range of the display unit. The resultant envelope pattern, illustrated for ideal linear amplification in FIG. 1, then appears on the display unit for examination. Although pulsed power source 23 preferably operates at a 50 percent duty cycle, its on/off ratio and repetition rate may be adjusted in any desired fashion.

Figure 3:
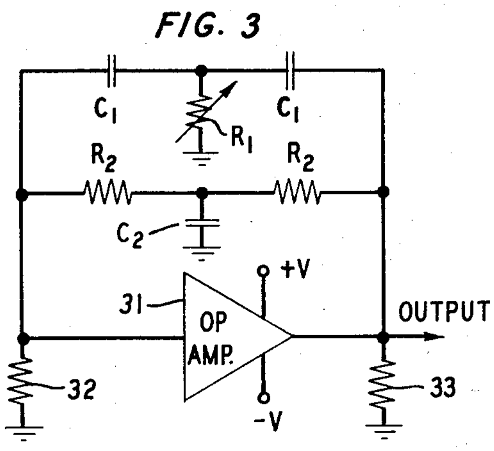
FIG. 3 is a schematic diagram of a pulsed oscillator which may be used in the practice of the invention.

In accordance with the invention, oscillators 21 and 22 each comprises a twin-tee oscillator of the form illustrated in FIG. 3. Details of the operation of such a configuration are known to those skilled in the art. In essence, operational amplifier 31, energized by power from source 23, usually of both polarities +V and −V, is bridged by two feedback paths. The first includes a pair of series connected resistors $R_2$ shunted at their junction point by capacitor $C_2$. The other employs a pair of series connected capacitors $C_1$ shunted at their junction point by variable resistance $R_1$. The input of the amplifier is biased by resistor 32 and the output of the oscillator is developed across resistor 33. Slight variations in the value of $R_1$ have large effects on the loss-phase characteristic of the twin-tee network. As a result, variation of the resistance of $R_1$ control the feedback characteristic such that it may become either an oscillator (positive feedback) or a reasonably high Q bandpass circuit with the Q determined by how close the feedback characteristic approaches the −1 point on a Nyquist plot. In general, obtaining a very high Q is impractical because of the great sensitivity of the feedback characteristic to variations in the amplifier or feedback path. The difference between a bandpass circuit and an oscillator becomes vanishingly small as the Q is increased.

Figure 4A:
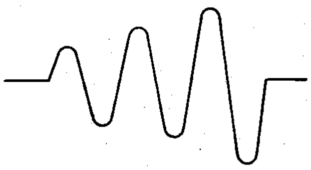
FIGS. 4A and 4B are waveforms useful in explaining the operation of the oscillator of FIG. 3.

However, by turning the amplifier on and off periodically, an output waveform can be obtained that has very desirable characteristics. First, assume that $R_1$ is too small so that the feedback combination would oscillate if left on continuously. In the pulsed condition, the output will consist of a series of bursts of audio waveform (frequency determined by the twin-tee network) of growing amplitude as shown in FIG. 4A. Each burst will be identical and always start with the same phase (not necessarily zero) providing that the turn-on transient waveform is consistent for each burst. In essence, turning on the power produces a transient which starts the feedback arrangement into oscillation. In a normal oscillator, the amplitude of this oscillation would increase exponentially until some nonlinear effect prevented additional growth. In this case, however, the amplifier is turned off long before the amplitude has built up sufficiently and the waveform shown in FIG. 4A is typical.

Figure 4B:
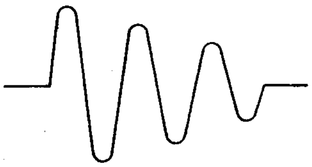

If, on the other hand, $R_1$ is too large, the feedback combination appears as a bandpass filter. If the bandwidth is sufficiently narrow, the transient response upon turning on the network will produce a damped oscillation which will decay at a rate determined by the effective Q of the combination. However, if the amplifier is turned off before the damped oscillation has decayed too far, the waveform of FIG. 4B is typical. Again, each burst will be identical and always start with the same phase relationship.

By adjusting $R_1$ to assure operation at the critical crossover threshold, a nearly constant amplitude audio burst of very pure sinewave configuration is obtained for many cycles. Misadjustment of $R_1$ simply causes the sinusoidal amplitude to grow or decay slightly during the burst.

By using two of the circuits of the configuration shown in FIG. 3, and operating them at different frequencies $f_1$ and $f_2$, a noncritical and very efficient two-tone test generator for testing linear amplifications is realized. The frequency of operation of each amplifier is determined by the proportioning of the resistive and capacitive elements of the circuit arrangement according to the following relations:

$$\omega_0^2 = \frac{1}{k\,(R_1)\,(R_2)\,(C_1)\,(C_2)} \qquad (2)$$

where $$k = \frac{R_2}{2\,(R_1)} = \frac{2\,(C_1)}{C_2}.$$

Frequency $\omega$, in Equation (2), is measured in radians per second, values of resistors R and capacitors C are measured in ohms and farads, respectively, and $k$ is a dimensionless operator.

Figure 5:
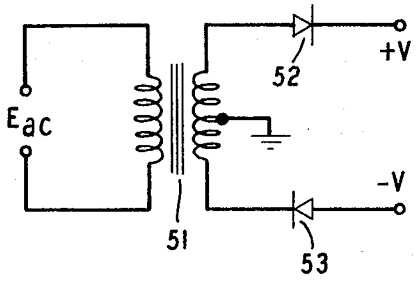
FIG. 5 illustrates a suitable pulsed power source for energizing the oscillators used in the practice of the invention.

Pulsed dc power for operational amplifier 31 of the two oscillator circuits may be developed in any one of a number of ways. Typically, an operational amplifier requires both polarities of dc and thus requires that two power supplies be pulsed. There are many conventional ways of doing this, for example, using multivibrators or gates. With such circuits, the duration of each pulse interval and the repetition rate may be adjusted as desired. It has been found, however, that a repetition rate of 60 Hz and a duty cycle of approximately 50 percent is satisfactory. Accordingly, an extremely simple pulsating power supply for providing the two polarities of dc power can be realized by means of a half-wave rectifier arrangement. One suitable circuit is shown in FIG. 5. Transformer 51 is energized by 60 Hz ac power $E_{ac}$. By center tapping the secondary of transformer 51, and by utilizing rectifiers 52 and 53 in a conventional half-wave arrangement, positive and negative dc pulses occurring at a 60 cycle repetition rate and having a 50 percent duty cycle are produced. Clipping the voltage peaks of the pulsed dc may be employed as desired.

The arrangement described above meets the basic criterion for obtaining a reproducible, pulsed, two-tone rf envelope at the output of a single sideband transmitter or other linear amplifier, namely, that each of the two applied input frequencies exhibit consistent phase during each burst. Since phase need not be continuous during off intervals, and since the two frequencies do not have to have any particular frequency or phase relationship, the described arrangement provides suitable bursts of sinusoidal waveform with reproducible frequency and phase during each burst. Moreover, with the oscillator configurations employed in the practice of the invention, the equivalent of an infinite Q tuned circuit is obtained and maintained over the necessary pulse intervals. Yet, circuit complexity is greatly reduced, and results comparable to those achieved with much more complex arrangements are obtained. Numerous variations and modifications of the principles involved in linear amplifier testing, as described herein, will occur to those skilled in the art.

What is claimed is:

1. Apparatus for analyzing the performance of a linear amplifier, which comprises, in combination, first oscillator means configured to break into oscillation at a first selected frequency always at the same phase point in a cycle of oscillation in response to supplied energizing power, second oscillator means configured to break into oscillation at a second selected frequency always at the same phase point in a cycle of oscillation in response to supplied energizing power, means for simultaneously energizing said first and second oscillator means for selected intervals at a prescribed rate, means for combining said oscillator signals, means for converting said combined signals into a single sideband suppressed carrier signal, means for passing said sideband signal through said linear amplifier under test, and means for displaying the wave shape of the sideband signal envelope derived from said linear amplifier for analysis.

2. Apparatus for generating a test signal for evaluating the performance of a linear amplifier, which comprises, first oscillator means responsive to supplied energizing power for producing signals at frequency $f_1$, second oscillator means responsive to supplied energizing power for producing signals at frequency $f_2$, each of said first and second oscillator means including an operational amplifier in a twin-tee configuration employing two feedback paths, at least one of which paths is adjusted to establish operation at the critical crossover threshold between oscillation and a high Q bandpass condition, means for simultaneously energizing said first and said second oscillator means for selected intervals at a prescribed rate, and means for combining said signals at frequency $f_1$ and said signals at frequency $f_2$ to produce a pulsed, composite two-tone test signal.

3. Apparatus as defined in claim 2, wherein, said energizing mean comprises a half-wave rectifier driven at 60 Hz rate by alternating energy.

4. Apparatus as defined in claim 2, wherein, said means for combining said signals comprises a single sideband modulator.

* * * * *